US010683114B2

(12) United States Patent
Saito et al.

(10) Patent No.: US 10,683,114 B2
(45) Date of Patent: Jun. 16, 2020

(54) TAPING APPARATUS

(71) Applicant: TAIYO YUDEN CO., LTD., Tokyo (JP)

(72) Inventors: Koji Saito, Tokyo (JP); Hajime Koyama, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 185 days.

(21) Appl. No.: 15/902,620

(22) Filed: Feb. 22, 2018

(65) Prior Publication Data

US 2018/0244414 A1 Aug. 30, 2018

(30) Foreign Application Priority Data

Feb. 24, 2017 (JP) ................................. 2017-033374
Jul. 27, 2017 (JP) ................................. 2017-145439

(51) Int. Cl.
| | | |
|---|---|---|
| B65G 29/00 | (2006.01) | |
| B65G 47/84 | (2006.01) | |
| B65G 35/06 | (2006.01) | |
| B65B 35/08 | (2006.01) | |
| B65B 35/26 | (2006.01) | |
| B65B 15/04 | (2006.01) | |
| B65G 47/14 | (2006.01) | |
| H01G 13/00 | (2013.01) | |

(52) U.S. Cl.
CPC .......... *B65B 15/04* (2013.01); *B65G 47/1492* (2013.01); *B65B 35/26* (2013.01); *H01G 13/00* (2013.01)

(58) Field of Classification Search
CPC ......... B65B 15/04; B65B 7/161; B65B 35/06; B65B 35/08; B65B 35/26; B65G 29/00; B65G 47/84; B65G 47/846; B65G 47/1457
USPC ....... 53/471, 281, 591; 198/459.2, 723, 392, 198/397.02
See application file for complete search history.

(56) References Cited

U.S. PATENT DOCUMENTS

| | | | | |
|---|---|---|---|---|
| 4,673,077 A | * | 6/1987 | Taniguchi | .......... B65G 47/1457 198/393 |
| 4,753,061 A | * | 6/1988 | Braden | .............. H05K 13/0084 53/281 |

(Continued)

FOREIGN PATENT DOCUMENTS

| | | |
|---|---|---|
| JP | H11-292252 A | 10/1999 |
| JP | 2006-168754 A | 6/2006 |

*Primary Examiner* — Praachi M Pathak
(74) *Attorney, Agent, or Firm* — Chen Yoshimura LLP

(57) ABSTRACT

A component conveyance disk of a taping apparatus has a plurality of component transport units at an equiangular interval. Each component transport unit is formed of three component transport grooves in a peripheral portion of the component conveyance disk. Width direction centerlines of the respective component transport grooves are parallel to each other, with a portion thereof in a direction along the width direction centerlines opening toward a component storage chamber. Dimensions along the width direction centerlines of the opened portion of the respective component transport grooves are shorter than a length of the component. In addition, the respective component transport grooves have component guides that guide the components into the respective component transport grooves.

14 Claims, 9 Drawing Sheets

(56) References Cited

U.S. PATENT DOCUMENTS

| | | | | |
|---|---|---|---|---|
| 5,863,331 | A * | 1/1999 | Braden | B23K 3/06 |
| | | | | 118/261 |
| 6,527,101 | B1 * | 3/2003 | Miyamoto | B65G 47/1457 |
| | | | | 198/397.04 |
| 7,161,346 | B2 * | 1/2007 | Fish | G01R 31/016 |
| | | | | 198/392 |
| 10,384,860 | B2 * | 8/2019 | Arai | B65D 85/02 |
| 2003/0205030 | A1 * | 11/2003 | Weiss | B65B 15/04 |
| | | | | 53/473 |
| 2010/0206693 | A1 * | 8/2010 | Garcia | H05K 13/021 |
| | | | | 198/392 |
| 2016/0368639 | A1 * | 12/2016 | Vissers | B65B 7/164 |
| 2018/0029783 | A1 * | 2/2018 | Arai | B65B 15/04 |
| 2018/0334334 | A1 * | 11/2018 | Tago | B65G 47/14 |

* cited by examiner

TAPING APPARATUS

BACKGROUND OF THE INVENTION

Technical Field

The present invention relates to a taping apparatus that includes a function of collectively inserting, as one insertion unit, a plurality of substantially rectangular cuboid components that have a relationship in which a length is larger than a width and a height (length>width, height), the components being inserted into a plurality of component housing recesses in a carrier tape.

Background Art

Patent Document 1 listed below discloses an apparatus that: has a plurality of holding holes arranged in a radial direction; uses a rotatable conveyance table on which a rotary shaft is horizontally supported; provides chip components from a supply unit into the plurality of holding holes arranged in the radial direction; and houses the plurality of chip components provided in the plurality of holding holes arranged in the radial direction within a plurality of recesses in a carrier tape via a discharge unit.

In addition, Patent Document 2 listed below discloses an apparatus that: uses a rotatable disk that has alignment hole groups each formed of a plurality of alignment holes in the radial direction; inserts workpieces from a workpiece supply means into the alignment hole group (into the plurality of alignment holes) of the disk; and transfers the plurality of workpieces inserted in the alignment hole group to a holding plate. FIG. 2 in Patent Document 2 also discloses a configuration in which the disk is inclined.

However, for a taping apparatus that includes a function of sequentially inserting substantially rectangular cuboid components, such as capacitors, inductors, and varistors, into component housing recesses in a carrier tape, there is demand for increasing the speed of component insertion and decreasing the size of the apparatus (reducing installation space). In regards to increasing the speed of component insertion, it is preferable to insert a plurality of components at one time rather than inserting one component at a time into the component housing recesses of the carrier tape. Meanwhile, in regards to decreasing apparatus size, it is preferable to cause the component conveyance disk that conveys provided components to the insertion location to rotate non-horizontally rather than causing the disk to rotate horizontally.

However, it is extremely difficult from a technical standpoint to configure the device such that the substantially rectangular cuboid components are provided to the component conveyance disk at a same orientation while causing the component conveyance disk to rotate in a non-horizontal manner, and such that a plurality of components can be sequentially inserted at one time into the component housing recesses of the carrier tape from the component conveyance disk after the components have been provided to the component conveyance disk. What is particularly difficult is providing components to the component conveyance disk and collectively inserting the components into the carrier tape from the component conveyance disk.

The apparatus disclosed in Patent Document 1 listed below uses a supply unit that uses the principle of a part feeder in order to provide the components into the plurality of holding holes arranged in the radial direction of the conveyance table. However, in order to provide the components into the plurality of holding holes, it is actually necessary to have the same number of supply units, which leads to the apparatus becoming larger, and when malfunctions occur in any of the supply units, components cannot be provided as expected. Meanwhile, the apparatus disclosed in Patent Document 2 listed below uses a workpiece supply means that has a comb-shaped guide in order to provide the components (workpieces) into the plurality of alignment holes arranged in the radial direction of the disk. However, it is difficult to provide substantially rectangular cuboid components into the respective alignment holes by such a means while controlling the orientation of the components, and, in particular, the degree of difficulty becomes markedly higher when the size of the components becomes smaller.

In addition, the apparatus disclosed in Patent Document 1 listed below houses the plurality of chip components provided in the plurality of holding holes arranged in the radial direction within the plurality of recesses in a carrier tape via a discharge unit. Thus, a discharge unit is necessary, which results in the device becoming larger, and when discharge malfunctions, jamming of components or the like, occurs in the discharge unit, collective insertion cannot be carried out as expected. Meanwhile, the apparatus disclosed in Patent Document 2 listed below is unable to move the carrier tape in the direction (the radial direction) in which the alignment holes are arranged due to the interference of the rotary shaft of the disk. As a result, a discharge unit as disclosed in Patent Document 1 listed below becomes necessary.

RELATED ART DOCUMENTS

Patent Documents

Patent Document 1: Japanese Patent Application Laid-Open Publication No. 2006-168754
Patent Document 2: Japanese Patent Application Laid-Open Publication No. H11-292252

SUMMARY OF THE INVENTION

The problem to be solved by the present invention is to provide a taping apparatus that can satisfy both increasing the speed of component insertion and decreasing the size of the apparatus, as well as satisfactorily provide components to a component conveyance disk and collectively insert the components from the component conveyance disk into a carrier tape.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a taping apparatus for inserting substantially rectangular cuboid components that have a length greater than a width and a height into respective component housing recesses of a carrier tape, configured to insert a prescribed plural number of the components into a corresponding plural number of the component housing recesses of the carrier tape at once, the taping apparatus including: a rotatable component conveyance disk that has, at a peripheral part thereof at an equiangular interval, a plurality of component transport units, each of the plurality of component transport units being constituted of the prescribed plural number of component transport grooves that are provided at the peripheral part of the component conveyance disk; a disk support unit that rotatably supports a rear surface of the component conveyance disk such that a front surface of the component conveyance disk is inclined relative to a vertical direction; a disk rotation device that intermittently rotates the component conveyance disk at an angle that corresponds to the equiangular interval at a time; a component supply unit having a component storage chamber to receive the components, the component supply unit being provided on a front side of a bottom part of the component conveyance disk, and causing the prescribed plural number of the components, among the components in the component storage chamber provided in bulk in the component storage chamber, to be inserted into the prescribed plural number of the component transport grooves of the component conveyance disk at once as the component conveyance disk is intermittently rotated; a tape guide unit that receives the carrier tape and guides straight running of the carrier tape, the tape guide unit being provided on a rear side at a top part of the component conveyance disk, the tape guide unit being configured to move the carrier tape in synchronization with the intermittent rotation of the component conveyance disk; and a component insertion device that is provided on a front side of the top part of the component conveyance disk, the component insertion device collectively pushing and transferring the prescribed plural number of the components that have been inserted into the component conveyance disk out of the component conveyance disk into the prescribed plural number of the component housing recesses of the carrier tape simultaneously at once, wherein each of the component transport grooves has a substantially rectangular shape that has a depth that is larger than the length of the component and a width that is larger than the height and the width of the component, and width direction centerlines of the prescribed plural number of the component transport grooves that belong to a same component transport unit are parallel to each other, wherein a bottom surface of the component storage chamber has a radius of curvature smaller than a radius of curvature of the component conveyance disk and inclines down rearward in such an arrangement that, with respect to each of the prescribed plural number of the component transport grooves, only a portion of the component transport groove in a direction along the width direction centerlines opens toward the component storage chamber with a dimension along the width direction centerlines of the opened portion of the component transport grooves being smaller than the length of the components, and wherein the component transport grooves each have a component guide to guide the component into the groove.

According to a taping apparatus of the present invention, it is possible to satisfy both increasing the speed of component insertion and decreasing the size of the apparatus, as well as satisfactorily provide components to a component conveyance disk and collectively insert the components from the component conveyance disk into a carrier tape.

It is to be understood that both the foregoing general description and the following detailed description are exemplary and explanatory, and are intended to provide further explanation of the invention as claimed.

DETAILED DESCRIPTION OF EMBODIMENTS

First, a component PA that will be inserted and a carrier tape CT into which the component PA will be inserted will be described using FIGS. 1A to 1C.

Figure 1A:
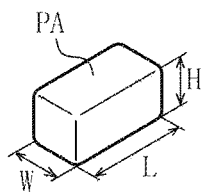
FIG. 1A is an external perspective view of a component that will be inserted.

As shown in FIG. 1A, the component PA has a substantially rectangular cuboid shape in which the basic dimensions have a relationship where a length L>a width W and a height H, and specifically, the basic dimensions have a relationship where the length L>the width W=the height H. Here, the length L, the width W, and the height H indicate each of the basic dimensions; thus, when dimensional tolerance is taken into account, a component in which the width W>the height H and a component in which the width W<the height H are also actually included. Furthermore, the component PA includes, electronic components such as capacitors, inductors, and varistors, and also components other than electronic components. Moreover, the component PA can be attracted using magnetic force.

Figure 1B:
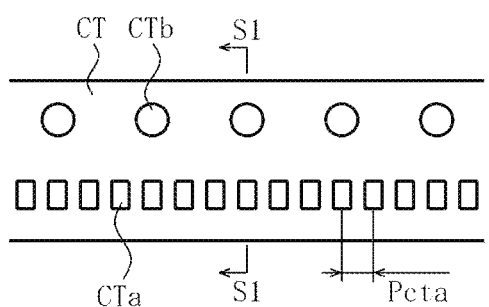
FIG. 1B is a partial top view of a carrier tape into which the component shown in FIG. 1A is inserted.
Figure 1C:
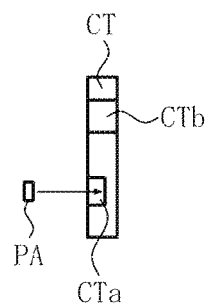
FIG. 1C is a cross-sectional view along a line 51-51 of the carrier tape shown in FIG. 1B.

As shown in FIGS. 1B and 1C, the carrier tape CT has an elongated belt shape, and has component housing recesses CTa, which are formed of recesses having a substantially rectangular cuboid shape that corresponds to the component PA shown in FIG. 1A, in a tape-traveling direction (a left-right direction in FIG. 1B) at an alignment pitch Pcta. In addition, the carrier tape CT has through-holes CTb, where sprocket (not shown) protrusions for feeding the tape are engaged, in the tape traveling direction (the left-right direction in FIG. 1B) at an alignment pitch that differs from the component housing recesses CTa.

Next, a configuration of a taping apparatus 10 will be described using FIGS. 2 to 7. FIG. 3 is a view of the taping apparatus 10 as taken from an orientation that directly faces a front surface of a component conveyance disk 15, and is not a view of the taping apparatus 10 taken from the left in FIG. 2. In addition, for the taping apparatus 10 described below, left, right, up (top), and down (bottom) in FIG. 2 are respectively denoted as front, back (rear), up, and down, and left and right in FIG. 3 are respectively denoted as left and right in FIG. 3.

Figure 2:
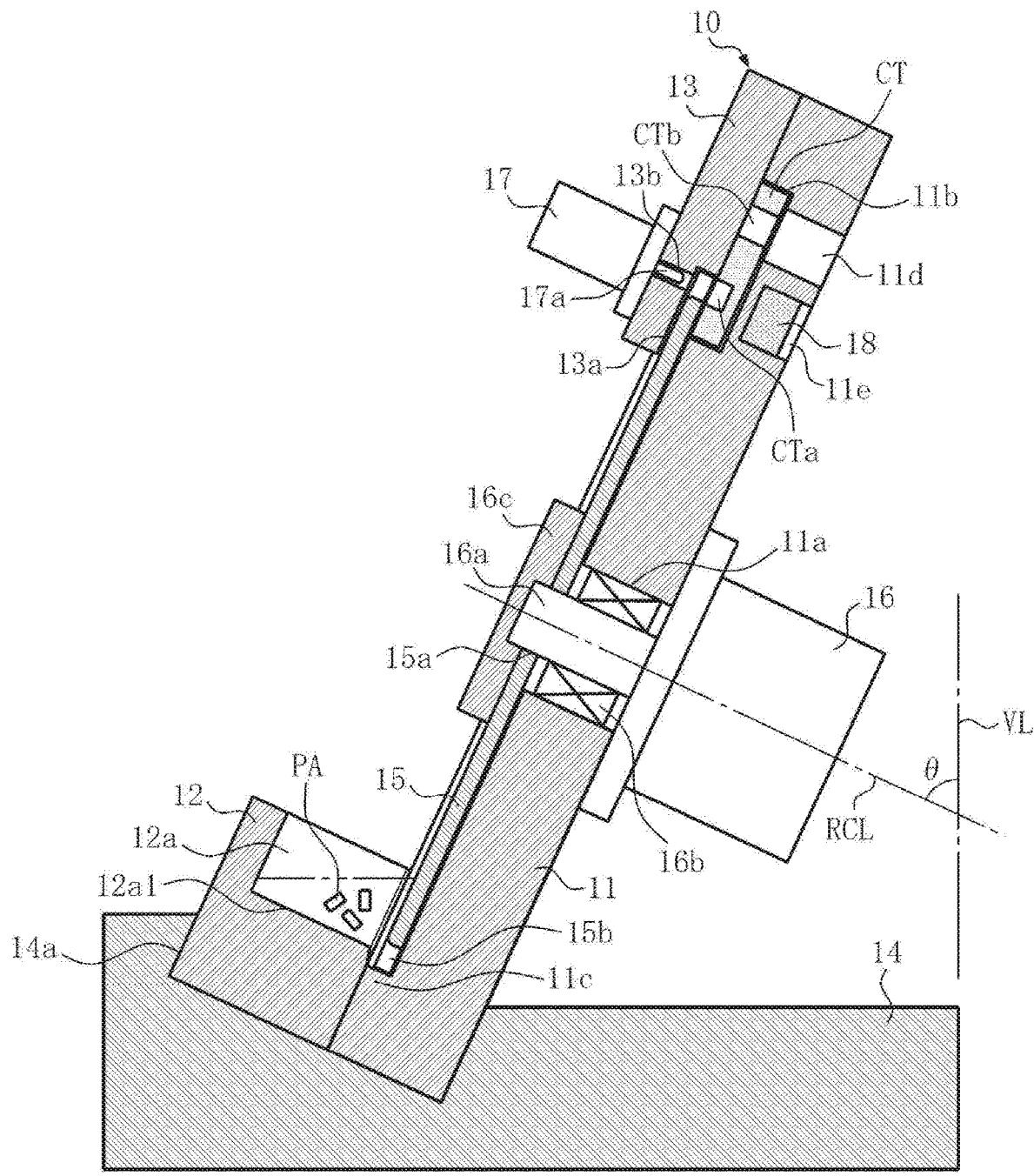
FIG. 2 is a vertical cross-sectional view of a taping apparatus in which the present invention has been applied.
Figure 3:
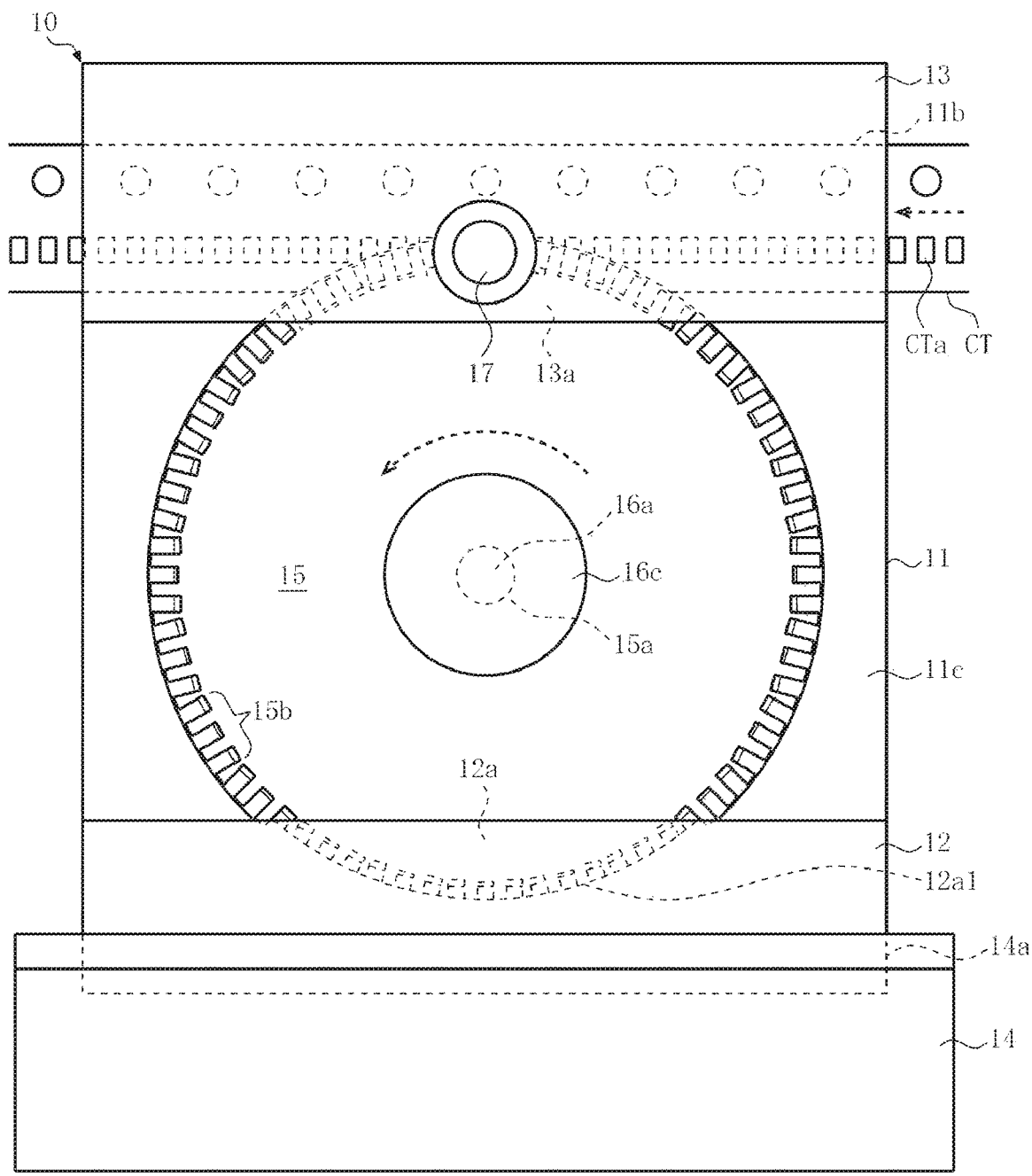
FIG. 3 shows a view of the taping apparatus in which the present invention has been applied from an orientation that directly faces a front surface of a component conveyance disk.

The reference character 11 shown in FIGS. 2 and 3 is a disk support unit, the reference character 12 is a component supply unit, the reference character 13 is a component insertion unit, the reference character 14 is a base, the reference character 15 is the component conveyance disk, the reference character 16 is a motor, the reference character 17 is a solenoid, and the reference character 18 is a permanent magnet. A mechanism for attaching a cover tape, which covers the component housing recesses CTa after the components have been inserted, to the carrier tape CT via thermocompression bonding or the like has been omitted from FIGS. 2 and 3.

The component supply unit 12 is disposed on a front side of a bottom part of the disk support unit 11. The component insertion unit 13 is disposed on the front side of a top part of the disk support unit 11. In addition, portions of the disk support unit 11 and the component supply unit 12 are fixed by being inserted into a recess 14a of the base 14. In this fixed state, the front surface of the disk support unit 11 is inclined upward, and an angle of inclination thereof is substantially the same as an angle of inclination of the component conveyance disk 15.

A shaft placement hole 11a that passes through the disk support unit 11 is provided at a substantial center of the disk support unit 11. In addition, a tape guide unit 11b that guides the straight running of the carrier tape CT is provided at front side of the top part of the disk support unit 11. The tape guide unit 11b has a cross-sectional shape that corresponds to the cross-sectional shape of the carrier tape CT, and is formed of a recess that extends in the left-right direction of the disk support unit 11. Furthermore, a disk guide unit 11c, which has on the inside thereof a guide surface with a radius of curvature slightly larger than a radius of curvature of the component conveyance disk 15, is provided in a portion of the front surface of the disk support unit 11 that excludes an uppermost portion thereof (a portion that faces the component insertion unit 13). Furthermore, a sprocket placement hole 11d is provided at a top part of a rear surface of the disk support unit 11, the sprocket placement hole 11d extending from the rear surface to the tape guide unit 11b. A sprocket (not shown) for feeding the tape is placed in the sprocket placement hole 11d, and a protrusion of the sprocket engages the through-holes CTb of the carrier tape CT movably inserted within the tape guide unit 11b. Furthermore, a permanent magnet placement recess 11e is provided below the sprocket placement hole 11d at the top part of the rear surface of the disk support unit 11. The permanent magnet placement recess 11e extends in the left direction from a location that faces at least three component insertion pins 17a, which will be mentioned later, and the permanent magnet 18, which is formed of a rare earth permanent magnet or the like, is disposed inside the permanent magnet placement recess 11e.

A component storage chamber 12a, which can store multiple components PA in a bulk state, or in other words, in a state where the orientations of the components PA are random, is provided in the component supply unit 12. A bottom surface 12a1 of the component storage chamber 12a has a radius of curvature smaller than the radius of curvature of the component conveyance disk, and is inclined so as to go downward to the rear (see FIGS. 6, 7A and 7B). In addition, an auxiliary component guide 12a2, which inclines toward the periphery of the front surface of the component conveyance disk 15 from the bottom surface 12a1, is continuously provided at a rear end section of the bottom surface 12a1 of the component storage chamber 12a (see FIGS. 7A and 7B). This auxiliary component guide 12a2 is formed of an inclined surface that inclines toward the periphery of the front surface of the component conveyance disk 15 from the rear end of the bottom surface 12a1 of the component storage chamber 12a.

A disk insertion recess 13a, in which an uppermost section of the component conveyance disk 15 is inserted in a rotatable manner, is provided in the component insertion unit 13. This disk insertion recess 13a has an arrow shape when viewed from an orientation directly facing the front surface of the component conveyance disk 15. In addition, a pin placement hole 13b, which passed through the component insertion unit 13 toward a front side section of the disk insertion recess 13a, is provided in the component insertion unit 13.

The motor 16 is a driving source for causing the component conveyance disk 15 to intermittently rotate at an angle corresponding to an equiangular interval, which will be mentioned later. The motor 16 is fixed to the rear surface of the disk support unit 11, and a shaft 16a thereof is disposed within the shaft placement hole 11a via a bearing 16b, the tip of the shaft 16a protruding from the front surface of the disk support unit 11. The component conveyance disk 15 is connected to the protruding portion of the shaft 16a using a disk connecting plate 16c. In other words, the motor 16 corresponds to a disk rotation device for causing the component conveyance disk 15 to intermittently rotate.

The solenoid 17 is a driving source for collectively inserting a plurality of the components PA into the component housing recesses CTa of the carrier tape CT from the component conveyance disk 15. This solenoid 17 is fixed to the front surface of the component insertion unit 13, and three component insertion pins 17a that are connected to plungers (not shown) of the solenoid 17 are movably disposed within the pin placement holes 13b. The alignment direction of the three component insertion pins 17a, which are simultaneously driven by the solenoid 17, is parallel to the tape guide unit 11b, and the interval between respective centerlines of the three component insertion pins 17a is substantially the same as the alignment pitch Pcta of the component housing recesses CTa of the carrier tape CT. In other words, the solenoid 17 and the three component insertion pins 17a correspond to a component insertion device that collectively inserts a plurality of the components PA into the component housing recesses CTa of the carrier tape CT from the component conveyance disk 15.

Figure 4:
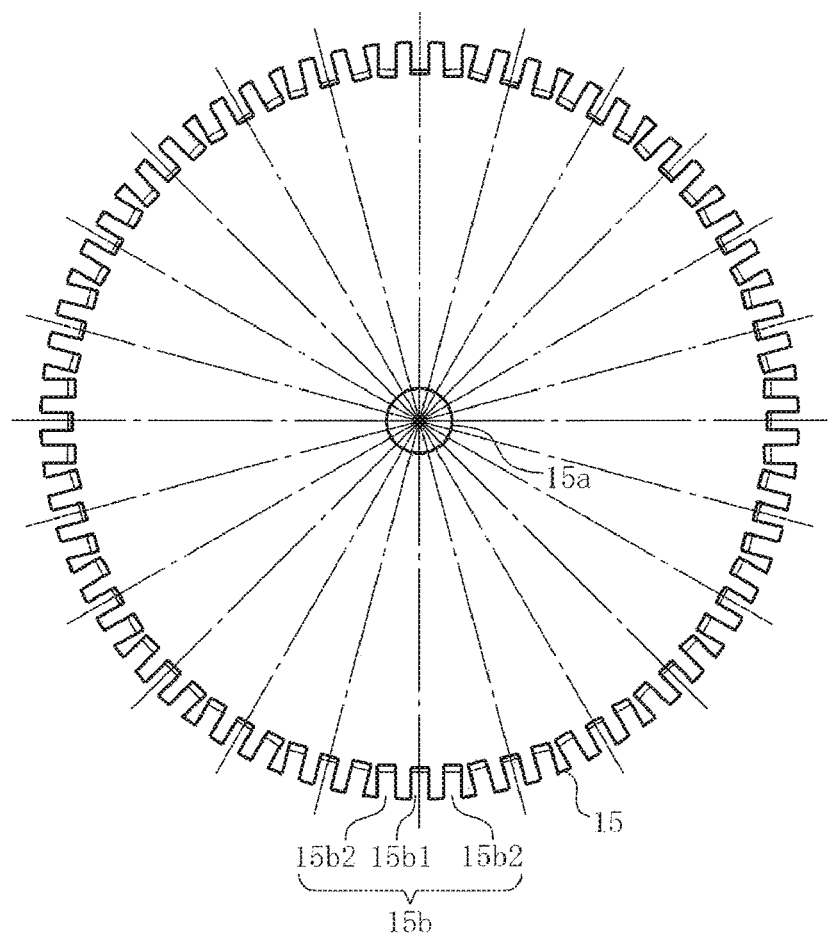
FIG. 4 is a front view of the component conveyance disk shown in FIGS. 2 and 3.

At least a peripheral portion of the component conveyance disk 15 has a fixed thickness, and the component conveyance disk 15 has a shaft connecting hole 15a at a center thereof. In addition, as shown in FIG. 4, the component conveyance disk 15 has component input units (component transport units) 15b each formed of three component input grooves (component transport grooves) 15b1 and 15b2 (one component input groove 15b1 and two component input grooves 15b2), which correspond to one insertion unit formed of three components PA, at an equiangular interval (a 15 degree interval in FIG. 4) indicated by a single-dash line at the peripheral portion. The shaft connecting hole 15a of the component conveyance disk 15 is connected to the tip of the shaft 16a of the motor 16, the rear surface of the component conveyance disk 15 is rotatably supported on the front surface of the disk support unit 11 as shown in FIG. 2, and, as shown in FIGS. 2 and 3, a peripheral surface of the component conveyance disk 15 is guided via the guide surface of the disk guide unit 11c of the disk support unit 11. In addition, as shown in FIGS. 2 and 3, the bottommost section of the component conveyance disk 15 faces the component storage chamber 12a of the component supply unit 12, and the uppermost portion of the component conveyance disk 15 is rotatably inserted into the disk insertion recess 13a of the component insertion unit 13. Furthermore, as shown in FIG. 2, the three component insertion pins 17a respectively face the three component input grooves 15b1, 15b2 of an uppermost component input unit 15b of the component conveyance disk 15, and the three component housing recesses CTa of the carrier tape CT movably inserted in the tape guide unit 11b respectively face the three component input grooves 15b1, 15b2.

In other words, the component conveyance disk 15 is rotationally driven by the motor 16 with the front surface thereof inclined upward. In regards to the angle of inclination of the component conveyance disk 15, as shown in FIG. 2, an angle θ formed between a centerline of rotation RCL of the component conveyance disk 15 and an imaginary vertical line VL is set within an acute angle range. In FIG. 2, the angle θ is shown to be 65 degrees, but the angle θ may be increased or decreased as long as the angle is within the acute angle range.

Figure 5:
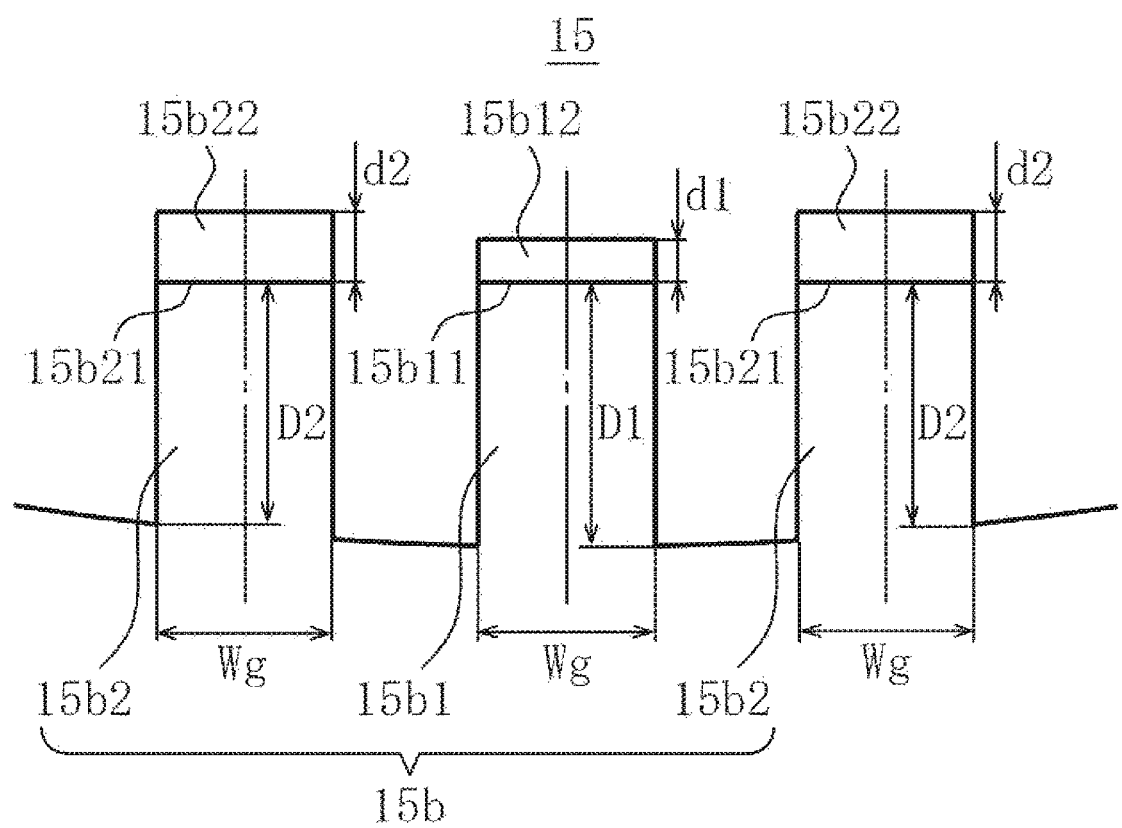
FIG. 5 is an enlarged view of a component input unit shown in FIG. 4.

In addition, as shown in FIG. 5, the three component input grooves 15b1, 15b2 that form the component input unit 15b have a substantially rectangular shape that has a width Wg that is slightly larger than a width W and a height H of the component PA, and depths (minimum depths) D1, D2 that are slightly larger than a length L of the component PA. Width direction centerlines (see the single-dashed lines) of the three component input grooves 15b1, 15b2 are not along a radial direction of the component conveyance disk 15 but are parallel to each other. In other words, the positions of the openings of the three component input grooves 15b1, 15b2 at a peripheral surface of the component conveyance disk 15 are at equiangular intervals, and the orientations of the two side component input grooves 15b2 are adjusted such that the width direction centerlines thereof are parallel to the width direction centerline of the one central component input groove 15b1.

Furthermore, as shown in FIG. 5, for the three component input grooves 15b1, 15b2, the positions, in a direction along the width direction centerlines, of deepest surfaces 15b11, 15b21 that define the respective depths D1, D2 match in a direction orthogonal to the width direction centerlines. In other words, the depth D2 of the two side component input grooves 15b2 is slightly smaller than the depth D1 of the one central component input groove 15b1.

Figure 6:
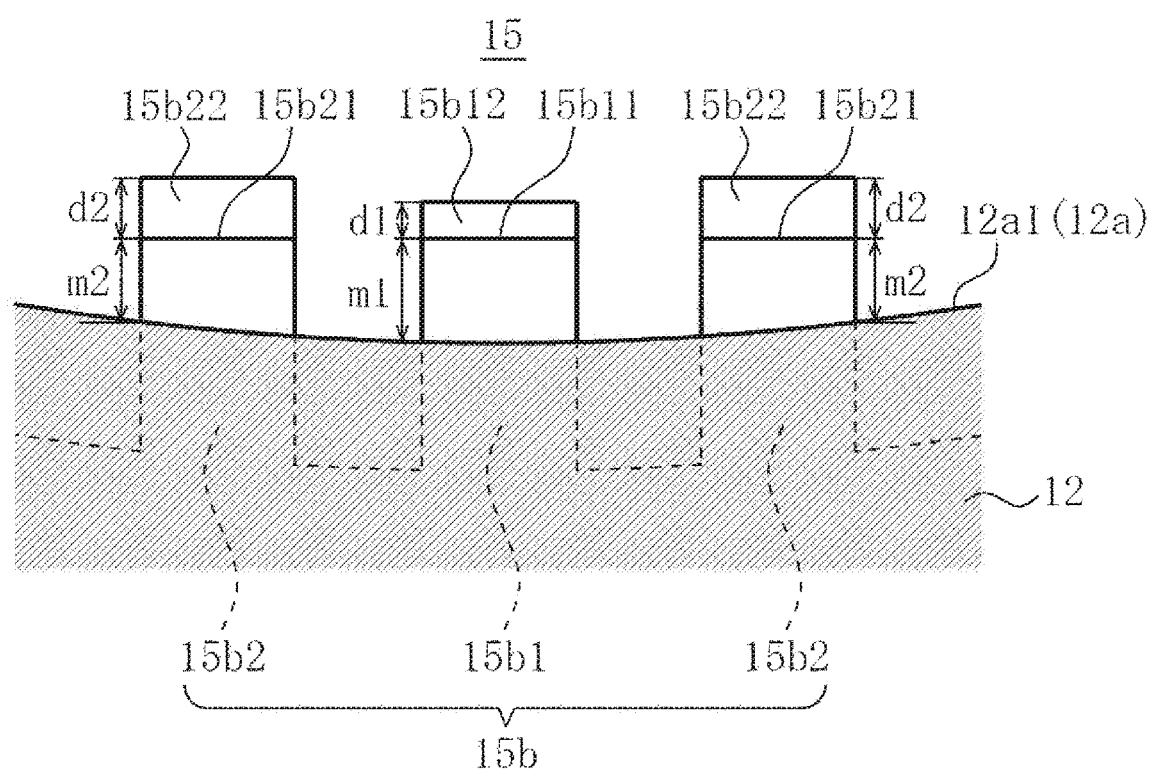
FIG. 6 is an enlarged view illustrating a positional relationship between the component input unit shown in FIG. 5 and a bottom surface of a component housing chamber shown in FIGS. 2 and 3.
Figure 7A:
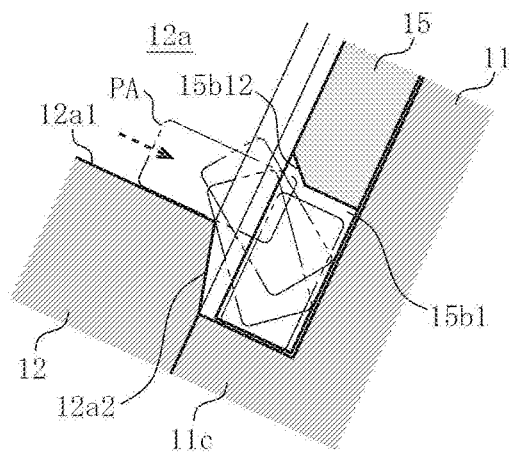
FIG. 7A is a vertical cross-sectional view of a central component supply groove of the component input unit shown in FIGS. 5 and 6.
Figure 7B:
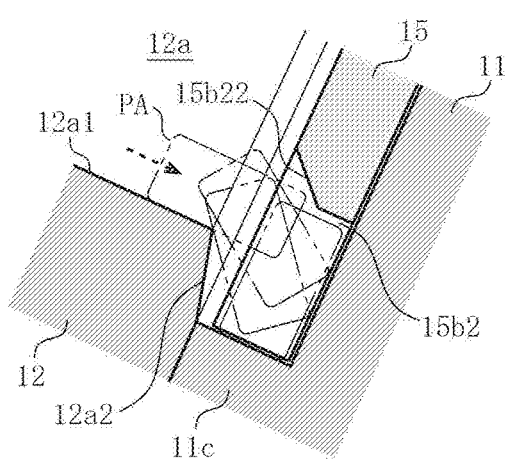
FIG. 7B is a vertical cross-sectional view of left and right component supply grooves of the component input unit shown in FIGS. 5 and 6.

Furthermore, as shown in FIGS. 5 to 7, the three component input grooves 15b1, 15b2 have component guides 15b12, 15b22 that extend from the deepest surfaces 15b11, 15b21 toward the front surface of the component conveyance disk 15. In terms of dimensions d1, d2 in the direction along the width direction centerlines of the component guides 15b12, 15b22, the two component input grooves 15b2 (the dimension d2) are larger than the one central component input groove 15b1 (dimension d1). The component guides 15b12, 15b22 shown in FIGS. 5 to 7B are formed of inclined surfaces formed between the deepest surfaces 15b11, 15b21 and the front surface of the component conveyance disk 15.

Furthermore, as shown in FIGS. 6, 7A and 7B, a radius of curvature of the bottom surface 12a1 of the component storage chamber 12a is smaller than a radius of curvature of the component conveyance disk 15; thus, when viewed from a direction directly facing the front surface of the component conveyance disk 15, a portion of the three component input grooves 15b1, 15b2 in the direction along the width direction centerline opens toward the component storage chamber 12a. Furthermore, since the width direction centerlines of the three component input grooves 15b1, 15b2 are parallel to each other and the positions along the direction along the width direction centerlines of the deepest surfaces 15b11, 15b21 that define the respective depths D1, D2 match in the direction orthogonal to the width direction centerlines, in terms of dimensions (minimum dimensions) m1, m2 in the direction along the width direction centerlines of the open portions of the three component input grooves 15b1, 15b2, the two side component input grooves 15b2 (m2) are smaller than the one central component input groove 15b1 (m1). The dimensions m1, m2 in the direction along the width direction centerlines of the open portions of the three component input grooves 15b1, 15b2 are each smaller than the length L of the component PA, and are preferably smaller than the width W and the height H of the component PA.

Furthermore, as shown in FIG. 6, the sum (m1+d1) of the dimension m1 in the direction along the width direction centerline of the open portion of the component input groove 15b1 and the dimension d1 in the direction along the width direction centerline of the component guide 15b12 and the sum (m2+d2) of the dimension m2 in the direction along the width direction centerline of the open portion of the component input grooves 15b2 and the dimension d2 in the direction along the width direction centerlines of the respective component guides 15b22 are slightly larger than the width W and the height H of the component PA. The reason for setting the dimensions in such a manner is so that the components PA can be satisfactorily provided within the three component input grooves 15b1, 15b2. This point will be explained below using FIGS. 7A and 7B.

The double-dashed lines in FIG. 7A show the supply operation of the component PA from the component storage chamber 12a to inside the one central component input groove 15b1. The double-dashed lines in FIG. 7B show the supply operation of the component PA from the component storage chamber 12a to inside the two side component input grooves 15b2. In either case, the components PA within the component storage chamber 12a move in the dashed arrow direction along the inclination of the bottom surface 12a1 in accordance with the intermittent rotation of the conveyance disk 15. One end in the length L direction of each component PA that moved in the dashed arrow direction rotationally displaces in a clockwise direction in the drawings upon contacting the component guide 15b12 or 15b22, and enters the corresponding component input groove 15b1 or 15b2 upon the orientation thereof matching the corresponding component input groove 15b1 or 15b2. In other words, the above-mentioned setting is used in order to cause the one end in the length L direction of the component PA that moved in the dashed arrow direction to contact the corresponding component guide 15b12 or 15b22 and then smoothly rotate in the clockwise direction.

The auxiliary component guide 12a2 provided at the rear end portion of the bottom surface 12a1 of the component storage chamber 12a is configured such that rotational displacement of the component PA can be performed without interference after the one end in the length L direction of the component PA that moved in the dashed arrow direction contacts the respective component guides 15b12, 15b22, and it is useful in a case where the dimensions m1, m2 in the direction along the width direction centerlines of the open portions of the component input grooves 15b1, 15b2 are small.

Next, the operation method and operation of the taping apparatus 10 will be described using mainly FIGS. 2 and 3.

When the components PA are inserted in the component housing recesses CTa of the carrier tape CT, the components PA are stored in bulk in the component storage chamber 12a, and the carrier tape CT is input into the tape guide unit 11b. Then, the component conveyance disk 15 is intermittently rotated in the dashed arrow direction in FIG. 3 at an angle corresponding to the equiangular interval via the motor 16, and a sprocket (not shown) is intermittently rotated via a sprocket motor (not shown), thereby intermittently moving the carrier tape CT in the dashed arrow direction in FIG. 3 at a dimension that is three times the alignment pitch Pcta.

The components PA stored in bulk in the component storage chamber 12a are, as the conveyance disk 15 intermittently rotates, provided into the three component input grooves 15b1, 15b2 of the respective component input units 15b via the supply operation previously described with reference to FIGS. 7A and 7B. When the three component input grooves 15b1, 15b2 of a single component input unit 15b of the intermittently rotating conveyance disk 15 stop at a position facing the three component insertion pins 17a, and the three component housing recesses CTa of the intermittently moving carrier tape CT stop at a position facing the three component insertion pins 17a, the three component insertion pins 17a move toward the carrier tape CT via the solenoid 17, and the components PA inside the three component input grooves 15b1, 15b2 are collectively inserted into the three component housing recesses CTa of the carrier tape CT.

The components PA collectively inserted into the three component housing recesses CTa of the carrier tape CT are attracted by the magnetic force of the permanent magnet 18 on a rear side of the component housing recesses CTa, and are held within the three component housing recesses CTa. Thereafter, the previously mentioned intermittent rotation of the conveyance disk 15, intermittent movement of the carrier tape CT, and component insertion are repeated. In other words, the collective insertion of the three components PA as one insertion unit into the component housing recesses CTa of the carrier tape CT is repeated.

Next, the principal effects achieved via the taping apparatus 10 will be described.

(Effect 1) The three components PA can be collectively inserted as one insertion unit into the three component housing recesses CTa of the carrier tape CT, and the component conveyance disk 15 is disposed such that the front surface thereof inclines upward; thus, it is possible to satisfy both speeding up component insertion and decreasing apparatus size (reducing installation space).

(Effect 2) It is possible to reliably provide the components PA stored in bulk in the component storage chamber 12a into the three component input grooves 15b1, 15b2 that form each component input unit 15b in accordance with the intermittent rotation of the conveyance disk 15. In addition, since a special mechanism is not needed to provide the components PA into the three component input grooves 15b1, 15b2 of each component input unit 15b, it is possible in this aspect to contribute toward reducing apparatus size.

(Effect 3) Since the width direction centerlines of the three component input grooves 15b1, 15b2 forming each component input unit 15b are parallel to each other, it is possible to smoothly and collectively insert the components PA provided in the respective component input grooves 15b1, 15b2 into the three component housing recesses CTa of the carrier tape CT.

(Effect 4) Since the dimensions m1, m2 along the width direction centerlines of the open portions of the three component input grooves 15b1, 15b2 forming each component input unit 15b are smaller than the length L of the component PA, it is possible to reliably prevent multiple components PA from entering each of the component input grooves 15b1, 15b2.

(Effect 5) Since the component guides 15b12, 15b22 that extend from the respective deepest surfaces 15b11, 15b21 toward the front surface of the component conveyance disk 15 are provided in the three component input grooves 15b1, 15b2 forming each the component input unit 15b, it is possible to smoothly provide the components PA into the respective component input grooves 15b1, 15b2 using the component guides 15b12, 15b22.

(Effect 6) Since the positions along the width direction centerlines of the deepest surfaces 15b11, 15b21 of the three component input grooves 15b1, 15b2 forming each component input unit 15b match up in the direction orthogonal to the width direction centerlines, the components PA provided in the respective component input grooves 15b1, 15b2 can be collectively inserted in a more smooth manner into the three component housing recesses CTa of the carrier tape CT without causing shifts in position.

(Effect 7) Since the dimensions m1, m2 in the direction along the width direction centerlines of the open portion of the three component input grooves 15b1, 15b2 forming each component input unit 15b are smaller than the width W and the height H of the components PA, and since the sum (m1+d1) of the dimension m1 in the direction along the width direction centerline of the open portion of the component input groove 15b1 and the dimension d1 in the direction along the width direction centerline of the component guide 15b12 and the sum (m2+d2) of the dimension m2 in the direction along the width direction centerline of the open portion of the component input grooves 15b2 and the dimension d2 in the direction along the width direction centerline of the component guide 15b22 are slightly larger than the width W and the height H of the components PA, it is possible to reliably prevent multiple components PA from entering into the respective component input grooves 15b1, 15b2, and it is possible to reliably provide the components PA into the respective component input grooves 15b1, 15b2 by using the respective component guides 15b12, 15b22.

(Effect 8) Since the auxiliary component guide 12a2 (the inclined surface inclined from the rear end of the bottom surface 12a1 of the component storage chamber 12a toward the periphery of the front surface of the component conveyance disk 15) that is toward the periphery of the front surface of the component conveyance disk 15 from the bottom surface 12a1 is continuously provided at the rear end portion of the bottom surface 12a1 of the component storage chamber 12a, it is possible, even in a case in which the dimensions m1, m2 in the direction along the width direction centerlines of the open portion of the component input grooves 15b1, 15b2 are small, to reliably rotationally displace the components PA after one end in the length L direction of the component PA in the component storage chamber 12a contacts each component guide 15b12, 15b22, or in other words, to reliably provide the components PA into the respective component input grooves 15b1, 15b2.

Next, modification examples of the above-mentioned taping apparatus 10 will be described.

MODIFICATION EXAMPLE 1

FIG. 2 shows a configuration in which the angle of inclination (the angle θ) of the component conveyance disk 15 is 65 degrees. However, the angle θ may be larger or smaller than 65 degrees as long as the angle is within an acute angle range. In addition, regardless of the angle θ, the following methods may be used as a method for preventing the components PA from flying off when the component conveyance disk 15 intermittently rotates after the components PA have been provided into the component input unit 15b: (1) a method in which an air suction path that extends to the component input grooves 15b1, 15b2 that form each component input unit 15b is formed on the rear surface or the like of the component conveyance disk 15, and, after the components PA are provided into the respective component input grooves 15b1, 15b2, the components PA are held within the respective component input grooves 15b1, 15b2 by air suction force (negative pressure); (2) a method in which a permanent magnet that faces toward the component input grooves 15b1, 15b2 that form each component input unit 15b is provided on the disk support unit 11, and, after the components PA are provided into the respective component input grooves 15b1, 15b2, the components PA are held within the respective component input grooves 15b1, 15b2 by magnetic force; and the like.

MODIFICATION EXAMPLE 2

A configuration was shown in which the tape guide unit 11b was provided at the top part of the front surface of the disk support unit 11. However, the top part of the disk support unit 11, for example, the portion that faces the component insertion unit 13, may be configured as a separate component, and this separate component may be disposed on the disk support unit. In such a configuration, when different types of carrier tape are used, it is possible to selectively dispose the separate component having a tape guide unit 11b that corresponds to the carrier tape, and the like, on the disk support unit; thus, it is possible to use a plurality of types of carrier tapes in one apparatus.

MODIFICATION EXAMPLE 3

Figure 8A:
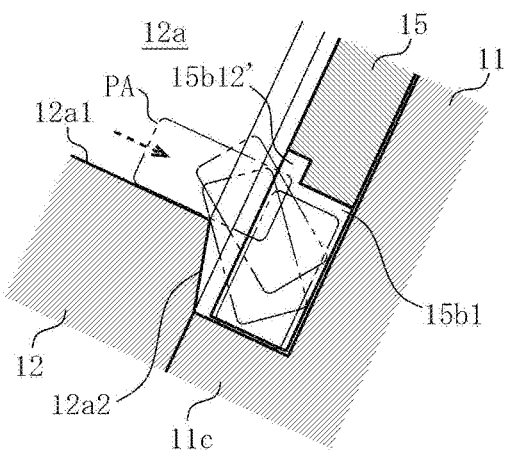
FIGS. 8A and 8B are vertical cross-sectional views that correspond to FIGS. 7A and 7B and respectively illustrate modification examples of the component supply grooves shown in FIGS. 7A and 7B.
Figure 8B:
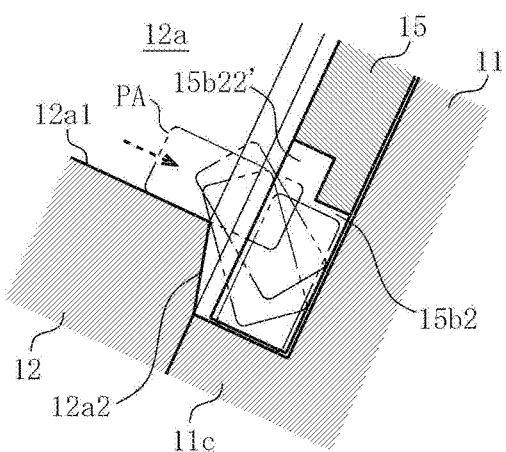

FIGS. 5 to 7B showed inclined surfaces, as the respective component guides 15b12, 15b22, that are respectively formed from the deepest surfaces 15b11, 15b21 of the respective component input grooves 15b1, 15b2 toward the front surface of the component conveyance disk 15. However as shown in FIGS. 8A and 8B, steps formed from the deepest surfaces 15b11, 15b21 of the respective component input grooves 15b1, 15b2 toward the front surface of the component conveyance disk 15 may be employed as respective component guides 15b12', 15b22'. Even in a case that uses such component guides 15b12', 15b22' made of steps, it is possible to achieve the same supply operation as the supply operation described previously using FIGS. 7A and 7B.

MODIFICATION EXAMPLE 4

Figure 9A:
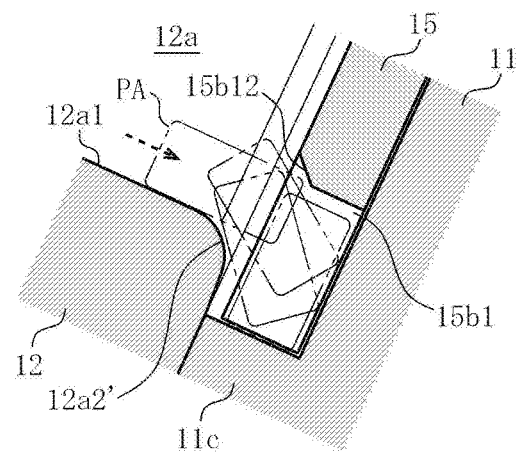
FIGS. 9A and 9B are vertical cross-sectional views that correspond to FIGS. 7A and 7B and respectively illustrate modification examples of an auxiliary component guide shown in FIGS. 7A and 7B.
Figure 9B:
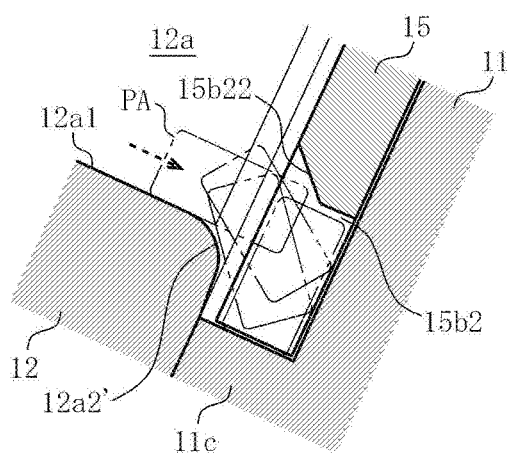

FIGS. 7A and 7B showed an inclined surface, as the auxiliary component guide 12a2, that is inclined from the rear end of the bottom surface 12a1 of the component storage chamber 12a toward the periphery of the front surface of the component conveyance disk 15. However, as shown in FIGS. 9A and 9B, a curved surface that curves toward the periphery of the front surface of the component conveyance disk 15 from the rear end of the bottom surface 12a1 of the component storage chamber 12a may be employed as an auxiliary component guide 12a2'. Even in a case that uses an auxiliary component guide 12a2' formed of such a curved surface, it is possible to achieve the same supply operation as the supply operation described previously using FIGS. 7A and 7B. In addition, by using sliding due to the curved surface, it is possible to more smoothly carry out the operation in which the components PA stored in bulk in the component storage chamber 12a are provided into the three component input grooves 15b1, 15b2 that form each component input unit 15b in accordance with the intermittent rotation of the conveyance disk 15.

MODIFICATION EXAMPLE 5

A configuration was shown as the component conveyance disk 15 where the component input units 15b, which were formed of the three component input grooves 15b1, 15b2, were provided in a peripheral portion thereof at an equiangular interval. However, the number of component input grooves forming one component input unit 15b may be 2, or 4 or more, and in accordance, the number of component insertion pins 17a may be 2, or 4 or more. In a case in which the component input unit 15b is formed of two component input grooves, for example, it is possible to use a configuration in which two of the one central component input groove 15b1 shown in FIG. 5 may be disposed next to each other. In addition, in a case in which the component input unit 15b is formed of four component input grooves, it is possible to use a configuration in which two of the one central component input groove 15b1 shown in FIG. 5 are disposed next to each other and two component input grooves 15b2 are disposed on both sides of the two component input grooves 15b1. Furthermore, in a case in which the component input unit 15b is formed of five component input grooves, it is possible to use a configuration in which, additional two component input grooves are disposed on both sides of the two component input grooves 15b2 shown in FIG. 5, and in which the dimension in the direction along the width direction centerline of each component guide is increased.

MODIFICATION EXAMPLE 6

FIG. 1A showed an example of the component PA to be inserted in which the basic dimensions had a relationship of length L>width W=height H. However, it is possible to insert a component where the basic dimensions have a relationship of length L>width W>height H or a component where the basic dimensions have a relationship of length L>height H>width W by modifying the dimensions of the respective component input grooves and the respective component guides.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A taping apparatus for inserting substantially rectangular cuboid components that have a length greater than a width, and greater than a height, into respective component housing recesses of a carrier tape, configured to insert a prescribed plural number of the components into a corresponding plural number of the component housing recesses of the carrier tape at once, the taping apparatus comprising:
- a rotatable component conveyance disk that has, at a peripheral part thereof at an equiangular interval, a plurality of component transport units, each of the plurality of component transport units being constituted of a prescribed plural number of component transport grooves that are provided at the peripheral part of the component conveyance disk;
- a disk support unit that rotatably supports a rear surface of the component conveyance disk such that a front surface of the component conveyance disk is inclined relative to a vertical direction;
- a disk rotation device that intermittently rotates the component conveyance disk at an angle that corresponds to said equiangular interval at a time;
- a component supply unit having a component storage chamber to receive the components, the component supply unit being separately provided from the component conveyance disk and fixed in position relative to the component conveyance disk such that the component storage chamber is positioned on a front side of a bottom part of the component conveyance disk, and causing said prescribed plural number of the components, among said components in the component storage chamber, to be inserted into said prescribed plural number of component transport grooves of the component conveyance disk at once as the component conveyance disk is intermittently rotated relative to the component supply unit;
- a tape guide unit that receives the carrier tape and guides the carrier tape, the tape guide unit being provided on a rear side at a top part of the component conveyance disk, the tape guide unit being configured to move the carrier tape in synchronization with the intermittent rotation of the component conveyance disk; and
- a component insertion device that is provided on a front side of the top part of the component conveyance disk, the component insertion device collectively pushing and transferring said prescribed plural number of the components that have been inserted into the component conveyance disk out of the component conveyance disk into said corresponding plural number of the component housing recesses of the carrier tape at once,
- wherein each of the prescribed plural number of component transport grooves has a substantially rectangular shape that has a depth that is larger than the length of the component and a width that is larger than the height and the width of the component, and width direction centerlines of said prescribed plural number of component transport grooves that belong to a same component transport unit are parallel to each other,
- wherein a bottom surface of the component storage chamber has a radius of curvature smaller than a radius of curvature of the component conveyance disk and inclines down rearward, and the component storage chamber of the component supply unit is positioned on the front side of the bottom part of the component conveyance disk in such an arrangement that, with respect to each of said prescribed plural number of component transport grooves, only a portion of the component transport groove in a direction along the width direction centerline opens toward the component storage chamber with a dimension along the width direction centerline of said opened portion of the component transport groove being smaller than the length of the component, and
- wherein each of the prescribed plural number of component transport grooves has a component guide to guide the component into the component transport groove.

2. The taping apparatus according to claim 1,
- wherein, with respect to said prescribed plural number of component transport grooves in each of the component transport units of the component conveyance disk, said prescribed plural number of component transport grooves are shaped such that the components inserted in the respective prescribed plural number of component transport grooves are arranged straight in a horizontal direction that is orthogonal to the width direction centerlines,
- wherein the dimension along the width direction centerline of the opened portion of each of the prescribed plural number of component transport grooves is smaller than the width and the height of the component, and
- wherein a sum of the dimension along the width direction centerline of the opened portion of each of the prescribed plural number of component transport grooves and the dimension along the width direction centerline of each of the component guides is larger than the width and the height of the component.

3. The taping apparatus according to claim 2, wherein the component guide in each of the prescribed plural number of component transport grooves is an inclined surface that is formed from a rear part of the component transport groove toward the front surface of the component conveyance disk.

4. The taping apparatus according to claim 2, wherein the component guide in each of the prescribed plural number of component transport grooves includes a step that is formed between a rear part of the component transport groove and the front surface of the component conveyance disk.

5. The taping apparatus according to claim 2, wherein the component storage chamber has an auxiliary component guide at the bottom surface of the component storage chamber adjacent to the front side of the bottom part of the component conveyance disk.

6. The taping apparatus according to claim 5, wherein the auxiliary component guide is an inclined surface that is inclined at a rear end of the bottom surface of the component storage chamber toward the front side of the bottom part of the component conveyance disk.

7. The taping apparatus according to claim 5, wherein the auxiliary component guide is a curved surface that curves at a rear end of the bottom surface of the component storage chamber toward the front side of the bottom part of the component conveyance disk.

8. The taping apparatus according to claim 2,
- wherein the components are attracted by magnetic force, and
- wherein the tape guide unit has a permanent magnet on a rear side thereof that attracts and pulls by magnetic force the components in said prescribed plural number of component transport grooves so as to assist the simultaneous transferring of the components into said corresponding plural number of the component housing recesses of the carrier tape.

9. The taping apparatus according to claim 1, wherein the component guide in each of the prescribed plural number of component transport grooves is an inclined surface that is formed from a rear part of the component transport groove toward the front surface of the component conveyance disk.

10. The taping apparatus according to claim 1, wherein the component guide in each of the prescribed plural number of component transport grooves includes a step that is formed between a rear part of the component transport groove and the front surface of the component conveyance disk.

11. The taping apparatus according to claim 1, wherein the component storage chamber has an auxiliary component guide at the bottom surface of the component storage chamber adjacent to the front side of the bottom part of the component conveyance disk.

12. The taping apparatus according to claim 11, wherein the auxiliary component guide is an inclined surface that is inclined at a rear end of the bottom surface of the component storage chamber toward the front side of the bottom part of the component conveyance disk.

13. The taping apparatus according to claim 11, wherein the auxiliary component guide is a curved surface that curves at a rear end of the bottom surface of the component storage chamber toward the front side of the bottom part of the component conveyance disk.

14. The taping apparatus according to claim 1,
wherein the components are attracted by magnetic force, and
wherein the tape guide unit has a permanent magnet on a rear side thereof that attracts and pulls by magnetic force the components in said prescribed plural number of component transport grooves so as to assist the simultaneous transferring of the components into said corresponding plural number of the component housing recesses of the carrier tape.

\* \* \* \* \*